(12) United States Patent
Johnson

(10) Patent No.: US 12,079,610 B2
(45) Date of Patent: Sep. 3, 2024

(54) DYNAMIC SOFTWARE PROVISIONING

(71) Applicant: DISH Wireless L.L.C., Littleton, CO (US)

(72) Inventor: Matthew Johnson, Parker, CO (US)

(73) Assignee: DISH Wireless L.L.C., Littleton, CO (US)

( * ) Notice: Subject to any disclaimer, the term of this patent is extended or adjusted under 35 U.S.C. 154(b) by 70 days.

(21) Appl. No.: 18/146,077

(22) Filed: Dec. 23, 2022

(65) Prior Publication Data

US 2024/0211227 A1 Jun. 27, 2024

(51) Int. Cl.
| | |
|---|---|
| G06F 9/44 | (2018.01) |
| G06F 8/61 | (2018.01) |
| G06F 8/71 | (2018.01) |
| G06F 9/445 | (2018.01) |
| G06F 9/455 | (2018.01) |
| G06F 15/16 | (2006.01) |

(52) U.S. Cl.
CPC . *G06F 8/61* (2013.01); *G06F 8/71* (2013.01)

(58) Field of Classification Search
CPC ..... G06F 8/61; G06F 8/71; G06F 8/65; G06F 8/433; G06F 8/60; G06F 8/63; H04L 63/20; H04L 63/0435; H04L 63/0876; H04L 63/08
See application file for complete search history.

(56) References Cited

U.S. PATENT DOCUMENTS 8,644,822 B1 * 2/2014 Phillips ............... H04L 65/1063
455/433

* cited by examiner

*Primary Examiner* — Thuy Dao
(74) *Attorney, Agent, or Firm* — Kilpatrick Townsend & Stockton LLP

(57) ABSTRACT

A computer-implemented method of provisioning a software service is provided. In one example, the method includes: receiving a request to provision the software service, the request including information indicating a profile configuring the software service on a source deployment platform; obtaining the profile based on the request from a web server interface; determining a version of the software service for provisioning the software service on a destination deployment platform; and generating a deployment document, the generating comprising writing the determined version of the software service to the deployment document.

20 Claims, 8 Drawing Sheets

DYNAMIC SOFTWARE PROVISIONING

BACKGROUND

The present exemplary embodiments relate generally to provisioning a software service on a deployment platform, and more particularly to systems, methods, and computer program products for the dynamic creation of software services on a designation deployment platform based on existing software services in a source deployment platform.

As technology advances, an enterprise is often presented with opportunities to improve upon or modernize its legacy data, applications, and software services. One such example is the migration of existing software applications from a current deployment platform to a new deployment platform that is updated or has advanced features. Significant saving on capital and operational expenditures may be achieved by migrating all or part of the enterprise's data, applications, and services to the new deployment platform. In addition, there is also a need to provision the same software services on multiple deployment platforms, with each deployment platform being responsible for a unique or different function.

Traditionally, the migration of software services from a source deployment platform to a destination deployment platform is based on a "one-by-one" process, which lacks time efficiency and uniformity particularly when the number of software services to be migrated is large. Further, the source and destination platforms may be significantly different in configuration and environment. In addition, converting the software services from one deployment platform into the other deployment platform may require extensive knowledge of both platforms. It may cost a great deal of time and effort for the software service managers to master the knowledge, particularly when the software services are different.

SUMMARY

In some embodiments, the present disclosure provides a method for provisioning a software service. In one example, the method includes: receiving a request to provision the software service, the request including information indicating a profile configuring the software service on a source deployment platform; obtaining the profile based on the request from a web server interface; determining a version of the software service for provisioning the software service on a destination deployment platform; and generating a deployment document, the generating comprising writing the determined version of the software service to the deployment document.

In some embodiments, the present disclosure provides a system for provisioning a software service on a destination deployment platform. In one example, the system includes: one or more electronic processors; a machine-readable storage medium in electronic communication with the one or more electronic processors; and instructions stored in the machine-readable storage medium and executable by the one or more electronic processors to cause the system to: receive a request to provision the software service, the request including information indicating a profile configuring the software service on a source deployment platform; obtain the profile based on the request from a web server interface; determine a version of the software service for provisioning the software service on the destination deployment platform; and generate a deployment document, the generating comprising writing the determined version of the software service to the deployment document.

In some embodiments, the present disclosure provides a non-transitory machine-readable storage medium encoded with instructions, the instructions executable to cause a processor of a system for provisioning a software service on a destination deployment to platform a method. In one example, the method includes: receiving a request to provision the software service, the request including information indicating a profile configuring the software service on a source deployment platform; obtaining the profile based on the request from a web server interface; determining a version of the software service for provisioning the software service on a destination deployment platform; and generating a deployment document, the generating comprising writing the determined version of the software service to the deployment document.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
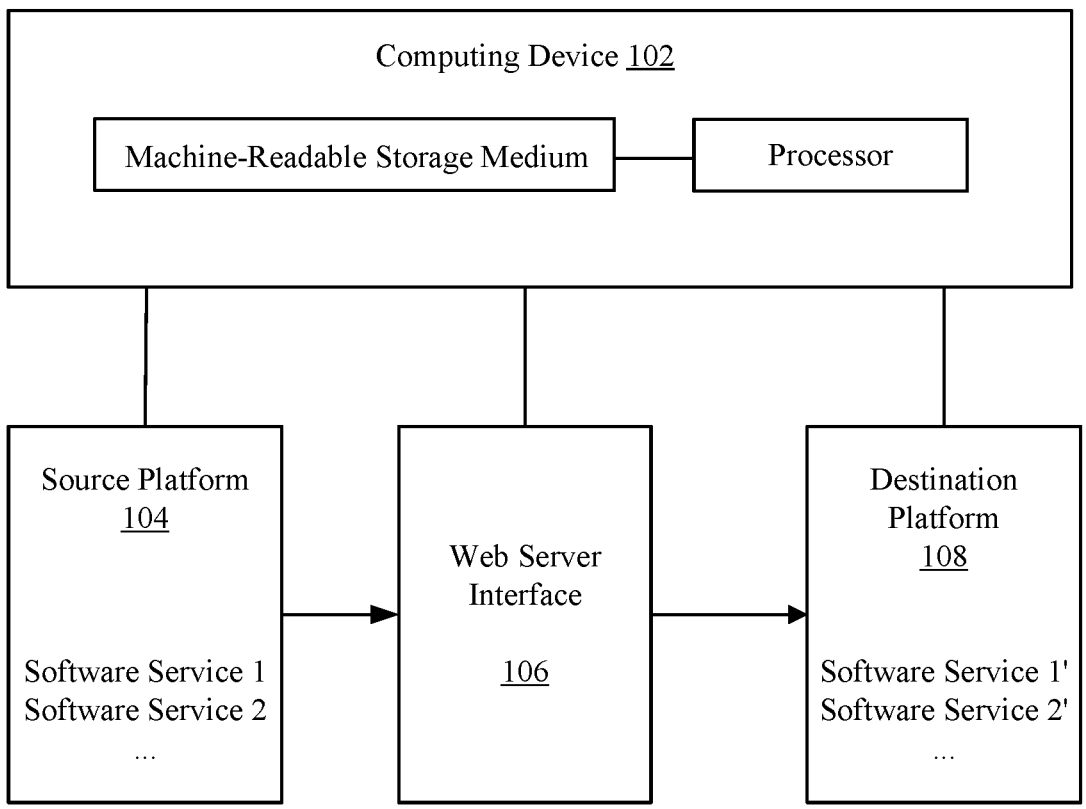
FIG. 1 is a schematic diagram illustrating an embodiment of a system.

As used herein, a "container orchestration platform" is a type of deployment platform that automates the deployment, management, scaling, and networking of containers. Enterprises that need to deploy and manage hundreds or thousands of containers can benefit from container orchestration platforms to manage their software services. Container orchestration platform can be used in any environment and can help the enterprises to deploy the same software service across different environments without needing to redesign it. And microservices in containers make it easier to orchestrate services, including storage, networking, and security. Examples of container orchestration platform include Cattle, Kubernetes, Docker Swarm, Mesosphere Marathon, AWS ECS (Elastic Container Service), EKS (Elastic Kubernetes Service), Azure Container Service, Google Container Engine, OpenShift, etc.

As used herein, a "service deployment platform" or an "application deployment platform" a "deployment platform" refers to a tool or a set of tools used for deploying, managing, delivering, provisioning, or otherwise making a software service or application available to a user.

As used herein, a "software service" refers to a service-oriented software architecture that has a software functionality or a set of software functionalities, such as the retrieval of specified information or the execution of a set of operations.

As used herein, a "microservice" is a software architectural design in which a single application is composed of many loosely coupled and independently deployable smaller components, or services. These services typically have their technology stack, inclusive of the database and data management model; communicate with one another over a combination of Application Programming Interfaces (APIs), event streaming, and message brokers; and are organized by business capability, with the line separating services often referred to as a bounded context.

As used herein, a "secret" is a type of data that includes passwords, security tokens, or other types of private keys. A deployment platform may have native support for storing and handling this data with care. Secrets enable container images to be created without bundling sensitive data. In a container orchestration platform, the containers are allowed to remain portable across environments. Secrets are exposed to pods via an explicit declaration in pod manifests and APIs.

As used herein, a "health-check" is a mechanism that checks if the objects in a deployment platform are alive and effective. In a container orchestration platform such as Kubernetes, the container orchestration platform periodically performs health checks to manage the containers and pods effectively. When a container orchestration platform determines that a service/container is unhealthy, it stops routing requests to that instance.

In various embodiments, a method is provided to provision a software service dynamically on a destination deployment platform based on a configuration of the software service on a source platform. One insight provided by the present disclosure is that developers or providers of software services can deploy their software services on the source platform and as well as on the destination deployment platform by only providing configurations on the source platform. In this way, a developer or provider of a given software service deployed on the source system does not need to have knowledge how to deploy the given software service on the destination system. In the method in those embodiments, intelligence is provided to generate one or more configurations for the given software service to be deployed on the destination system based on a configuration of the given software service on the source system.

In some embodiments, the software services are microservices achieving one or more functions designated to individual ones of the micro-services. In some embodiments, the source platform is a first type of orchestration platform having one or more configurations for the micro-services specific to the first type of orchestration platform. In some embodiments, the destination deployment platform is a second type of orchestration platform having one or more configurations for micro-services different from the first type of orchestration platform. In those embodiments, the method dynamically generates the one or more configurations for the micro-services dynamically for the second type of orchestration platform based on at least one configuration for the micro-services on the first type of orchestration platform.

FIG. 1 illustrates an example of a system 100 for provisioning a software service. In the illustrated example, the system 100 includes a computing device. The computing device further includes at least one electronic processor and a machine-readable storage medium. The machine-readable storage medium contains machine-readable instructions that can be executed by the at least one electronic processor. When the machine-readable instructions are executed, the electronic processor is caused to implement a method for provisioning the software.

In some embodiments, the system 100 includes a source deployment platform 104, a web server interface 106, and a destination deployment platform 108. The source deployment platform 104 is operably connected to the computing device 102 and contains at least one software service that is currently deployed thereon. Similarly, the destination deployment platform 108 is operably connected to the computing device 102 and is configured to receive deployment of at least one software service provisioned by the system 100. In some embodiments, the system 100 is configured to dynamically create and deploy software services on the destination deployment platform based on the existing software services deployed on the source deployment platform. In some embodiments, the system 100 is configured to dynamically deploy software services on the destination deployment platform 108 based on the existing software services deployed on the source deployment platform and maintain the same software services deployed on both the source deployment platform and the destination deployment platform. In some embodiments, the software service (e.g., service 1', service 2', . . . ) provisioned by the system and deployed on the destination deployment platform correspond to the existing software services (e.g., service 1, service 2, . . . ) deployed on the source deployment platform. In some embodiments, the software service is a microservice described herein.

The web server interface 106 is operably connected to the computing device 102. The web server interface provides a Development/Operations (DevOps) platform that combines the ability to develop, secure, and operate software in a single application and is configured to allow its users to automate the builds, integration, and verification of programing codes. An example of the web server interface is GitLab. A series of jobs associated with each of the software services on the source deployment platform and the destination deployment platform may be stored, organized, operated, and managed on the web server interface.

In some embodiments, the deployment platform (e.g., the source deployment platform or the destination deployment platform) described herein is a container orchestration platform. Container orchestration is the automation of much of the operational effort required to run containerized workloads and services. This includes a wide range of things software teams need to manage a container's lifecycle, including provisioning, deployment, scaling (up and down), networking, load balancing, and more. Container orchestration is key to working with containers, and it allows organizations to unlock their full benefits. It also offers its own benefits for a containerized environment, including: (1) Simplified operations: This is the most important benefit of container orchestration and the main reason for its adoption. Containers introduce a large amount of complexity that can quickly get out of control without container orchestration to manage it. (2) Resilience: Container orchestration tools can automatically restart or scale a container or cluster, boosting resilience. (3) Added security: Container orchestration's automated approach helps keep containerized applications secure by reducing or eliminating the chance of human error.

In some embodiments, the source deployment platform is the Cattle platform (sometimes also referred to as "cattle").

In some embodiments, the destination deployment platform is the Kubernetes platform (sometimes also referred to as "Kubernetes"). Both Cattle and Kubernetes are container orchestration platforms. Cattle has been used extensively by Rancher users to create and manage applications based on Docker containers. Although Cattle is based on similar concepts of namespaces, pods, scheduling, etc., it became unusable for heavy and dynamically changing production projects due to its simplicity. On the other hand, Kubernetes is more advanced and designed to be extendable as compared with Cattle. Kubernetes enables developers to easily build containerized applications and software services, as well as scale, schedule and monitor those containers. Kubernetes provides extensive container capabilities, a dynamic contributor community, the growth of cloud-native application development and the widespread availability of commercial and hosted Kubernetes tools. Kubernetes is also highly extensible and portable, meaning it can run in a wide range of environments and be used in conjunction with other technologies, such as service meshes. In addition to enabling the automation fundamental to container orchestration, Kubernetes is considered highly declarative. This means that developers and administrators use it to essentially describe how they want a system to behave, and then Kubernetes executes that desired state in dynamic fashion.

Figure 2:
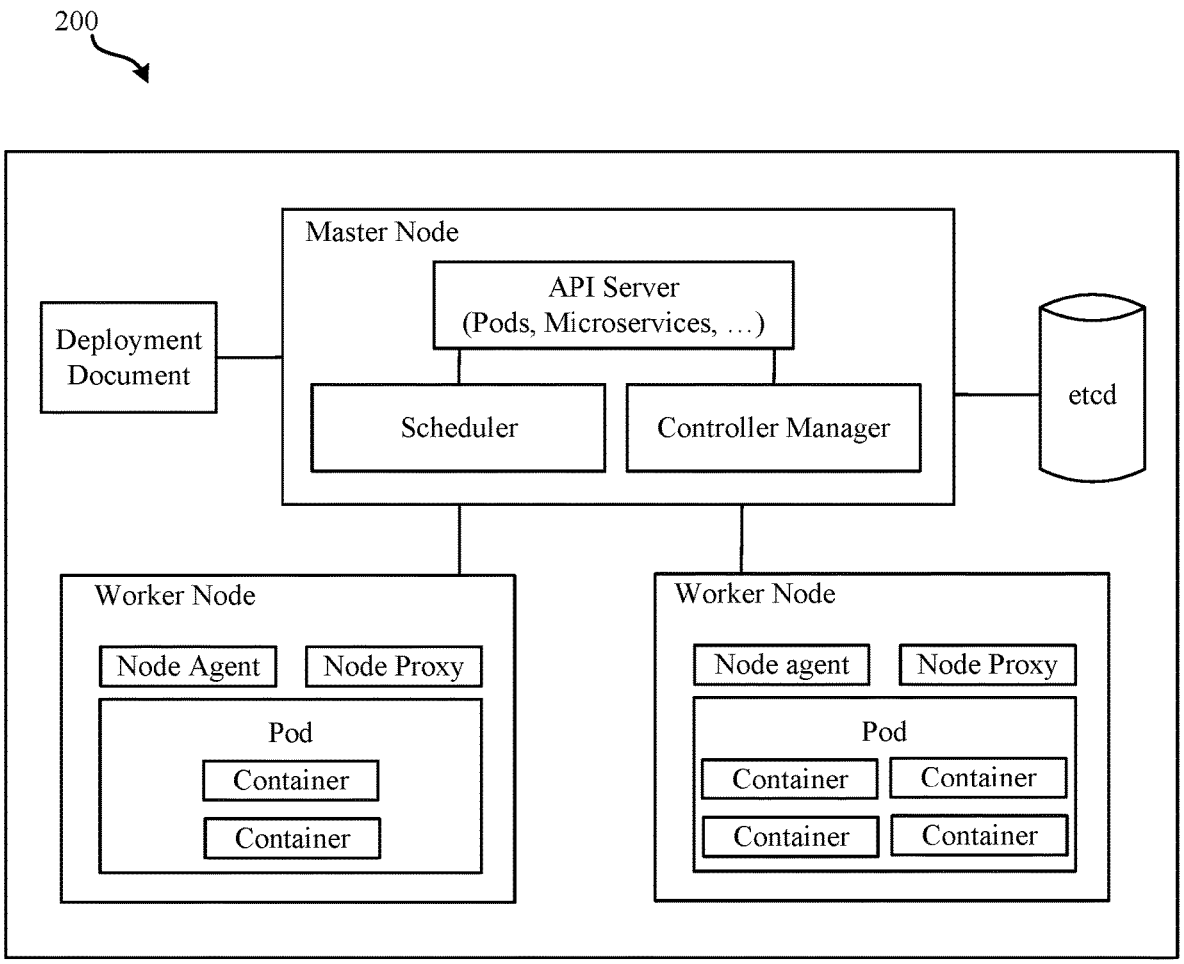
FIG. 2 is a schematic diagram illustrating an embodiment of a deployment platform.

FIG. 2 shows a schematic diagram illustrating an example of a container orchestration platform. In the illustrated example of FIG. 2, a container orchestration platform 200 includes a master node (also called a control plane), at least one worker node, and at least one etcd. The master node includes an API server, a scheduler, and a controller manager. The API server enables all the communication API. It takes the request and sends it to other services. In a Kubernetes platform, a command-line tool (CLI) such as Kubectl can be used to manage the Kubernetes Cluster. Kubectl sends the request to the API server and then the API server responds back.

The etcd is an open source, distributed, consistent key-value store for shared configuration, service discovery, and scheduler coordination of distributed systems or clusters of machines. The etcd helps to facilitate safer automatic updates, coordinates work being scheduled to hosts, and assists in the set-up of overlay networking for containers.

The scheduler picks up the container and puts it on the right node based on different factors. The factors include but are not limited to individual and collective resource requirements, hardware/software/policy constraints, affinity and anti-affinity specifications, data locality, and inter-workload interference and deadlines.

The controller manager may include a node controller configured to check a status of the nodes and notice and respond when the nodes go down, a replication controller configured to maintain the correct number of pods in each worker node, an endpoint controller configured to populate the endpoint objects, and a service account and token controller configured to create default accounts and API access tokens for new namespace.

Each of the worker nodes includes a node agent, a node proxy, and a container runtime. The node agent runs on each worker node and can register the worker node with the apiserver using one of: the hostname; a flag to override the hostname; or specific logic for a cloud provider. The node proxy is a network proxy that runs on each node in your cluster, implementing part of the service concept. The worker node may include a container runtime, which is a software application responsible for running containers. The worker node may further include at least one of: a DNS addon, a Web UI addon, a container resource monitoring an addon, a cluster level logging addon.

During operation, the command-line tool (e.g., Kubectl of a Kubernetes platform) sends the request to the API server. The API server stores the information in the etcd. The scheduler will pick up such information. If the information is creating pod/container, it will find the right node based on the algorithms and will identify the worker node and then send the information to the node agent on the corresponding worker node.

Each worker node includes at least one pod. The pod is the smallest entity in the Kubernetes platform. Each pod can contain one or more containers. A pod can run web service, database service. A pod can run multiple containers. The container runs the actual service and if it's a web service, it will have a port. That port will be of the container and the pod will have the IP address. If run multiple containers run in a pod, they all will have the same IP address.

Figure 3:
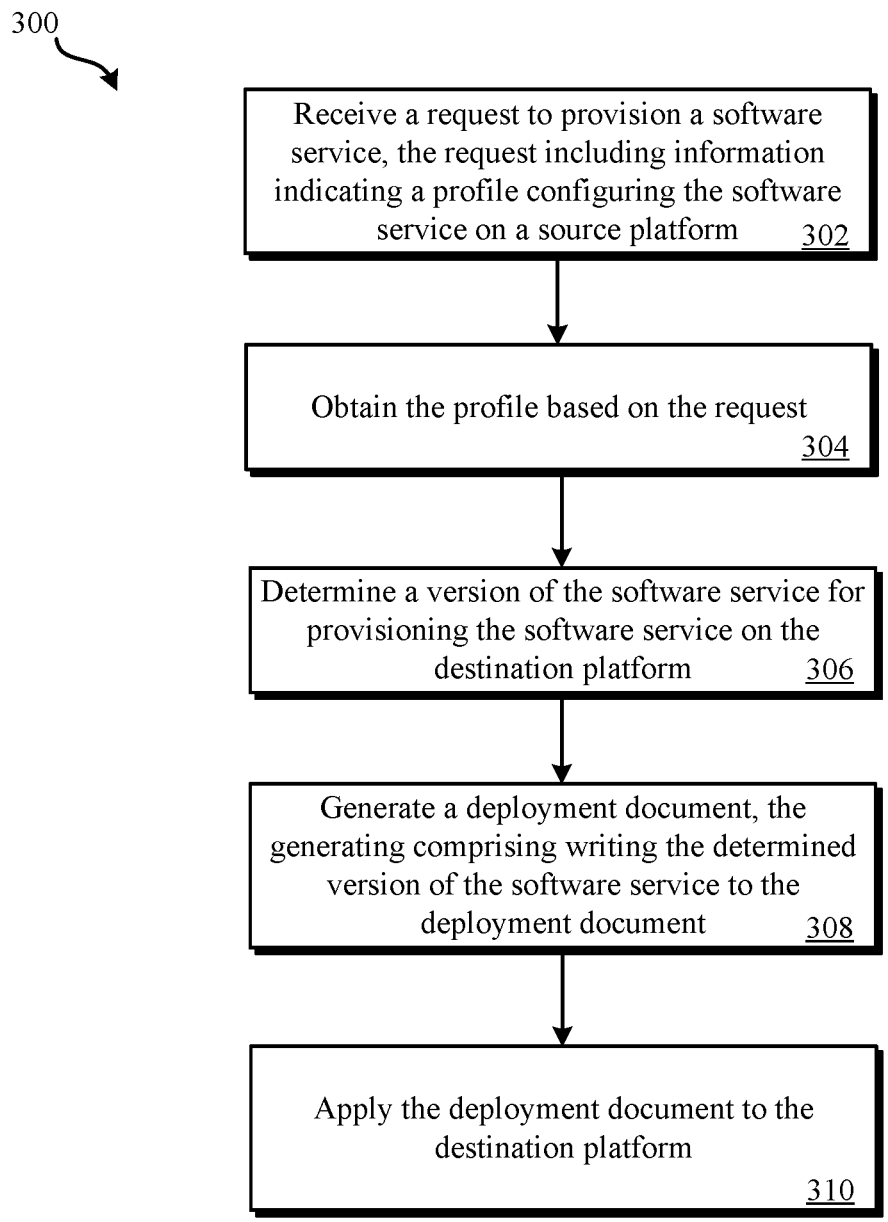
FIG. 3 is a flowchart diagram illustrating an embodiment of a method.

FIG. 3 is a flowchart diagram illustrating an example method 300 for provisioning a software service on a destination platform. In the illustrated example, the method 300 includes operations 302, 304, 306, 308, and 310. At operation 302, a request to provision a software service is received. The request includes information indicating a profile configuring the software service on a source platform. In some embodiments, a batch launcher or a bulk launcher may be used to handle one or more requests for provisioning multiple software services. In some embodiments, the batch launcher, when run, may process a part or all of the requests, in a given order in which they are added. Accordingly, multiple software services may be provisioned on the destination deployment platform using the batch launcher.

At operation 304, a profile or manifest based on the request is obtained. The profile can be obtained from a web server interface such as GitLab. In some embodiments, the profile corresponds to a pipeline associated with the software service on the source deployment platform. The pipeline contains a series of jobs operable on the web server interface. The web server interface may further contain information on the name, location, configuration, related to the service or the jobs associated therewith.

At operation 306, a version of the software service for provisioning the software service on the destination deployment platform is determined. In some embodiments, operation 306 further includes obtaining multiple versions of the software services that existed on the source deployment platform; testing or screening the multiple versions of the software service that existed on the source deployment platform; and determining the right or required version of the software service to be provisioned on the destination deployment platform. In some embodiments, the right or required version of each of multiple software services are respectively determined. By way of non-limiting example, the software service may have two versions in the source platform—one is the latest version without being fully tested and another version is older but is fully tested. In that example, at 306, the correct version of the software service is determined based on a rule specified, for example, by an administrator. For instance, the rule may be set to specify that the latest version of the software service should be deployed on the destination platform; and/or the rule may be set to specify that the version that has been fully tested should be deployed. In that instance, based on one or more of such a rule, it can be determined which version of the software service should be deployed on the destination platform.

At operation 308, a deployment document is generated. Generating the deployment document includes writing the determined version of the software service that existed on the source deployment platform to the deployment document. In some embodiments, multiple deployment documents are generated, each deployment document corresponding to a software service that is existing on the source deployment platform and is to be deployed on the destination deployment platform.

At operation 310, the deployment document is applied to the destination deployment platform to deploy the corresponding software service thereon. In some embodiments, multiple deployment documents are applied to the destination deployment platform to respectively deploy the corresponding multiple software services. In some embodiments, the deployment document is sent to and received by a repository manager (e.g., JFrog Artifactory used within Kubernetes), before being applied to the destination deployment platform. In some embodiments, the repository manager is capable of supporting all available software package types, enabling automated continuous integration and delivery. In some embodiments, the destination deployment platform is the Kubernetes platform, and the repository manager is a Kubernetes registry that supports all major development technologies making up the applications and allows users to deploy containerized microservices to the Kubernetes cluster as it serves as a universal repository manager for all the CI/CD needs, regardless of where they are running in the organization. Once the deployment documents are received by the artifactory, users can proceed to propagate and perform the build, test, promote and finally deploy to the Kubernetes platform.

Figure 4:
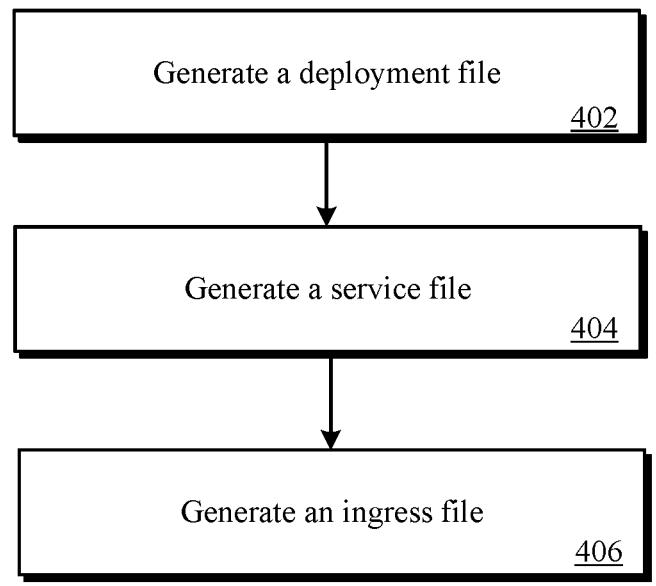
FIG. 4 is a flowchart diagram illustrating an embodiment of an operation of the method according to FIG. 3.

FIG. 4 is a flow chart diagram illustrating an example of the operation 308 of the method 300 shown in FIG. 3. In some embodiments, the operation 308 further includes operations 402, 404, and 406. At operation 402, a deployment file is created. At operation 404, a service file is created. At operation 406, an ingress file is created. Further examples of the operations 402, 404, and 406 are described below with references to FIGS. 5, 6, and 7, respectively. In some embodiments, the destination deployment platform is the Kubernetes platform, the deployment file is a YAML, the service file is a service YAML, and the ingress file is an ingress YAML. Accordingly, the deployment document may include the deployment YAML, the service YAML, and the ingress YAML, operably for deploying the corresponding software service on the destination deployment platform.

Figure 5:
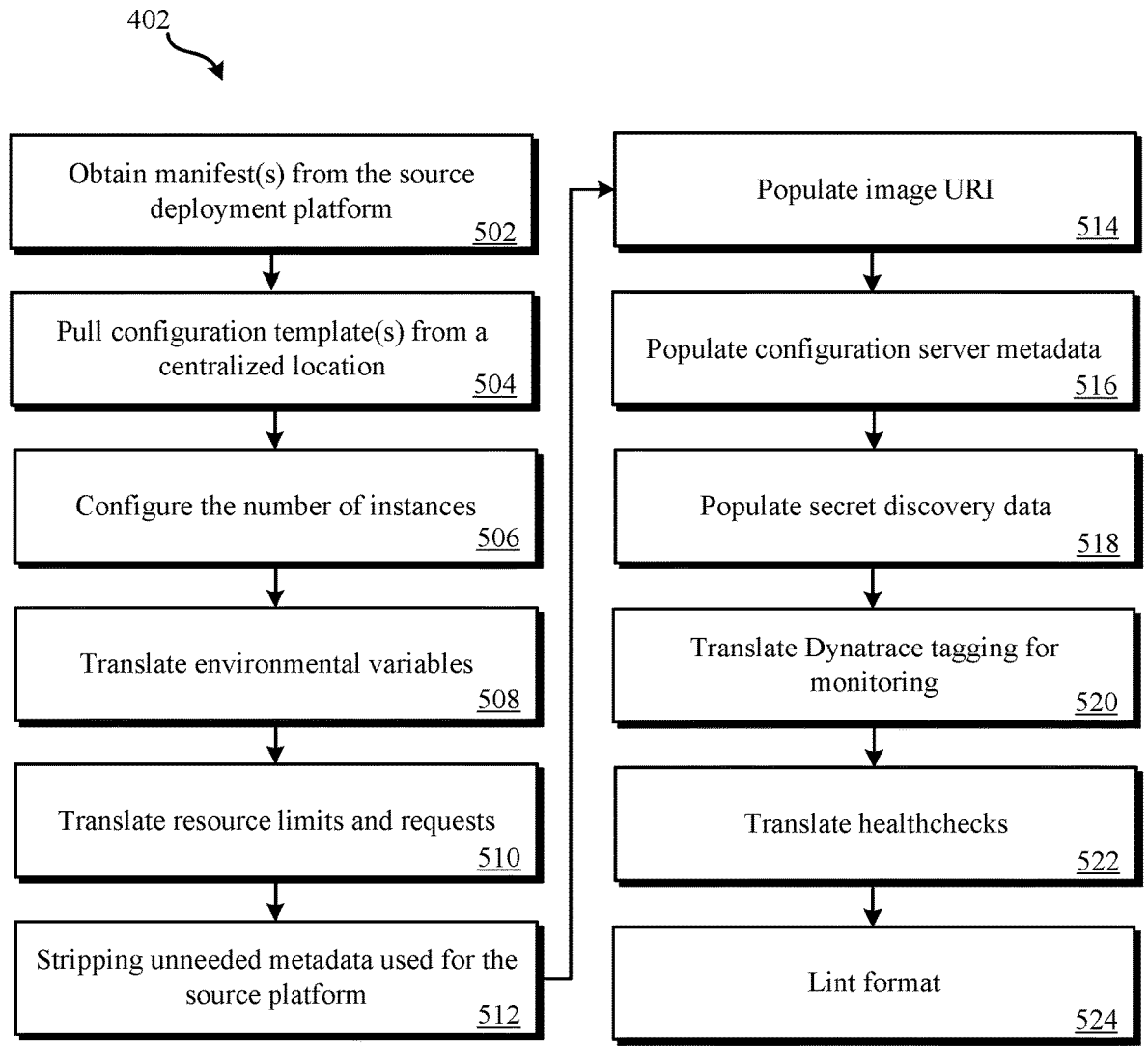
FIG. 5 is a schematic diagram illustrating an embodiment of an operation of the method according to FIG. 4.

FIG. 5 is a flowchart diagram illustrating an example of operation 402 according to FIG. 4. As mentioned above, the operation 402 includes generating a deployment file of the deployment document. In some embodiments, the operation 402 further includes operations 502, 504, 506, 508, 510, 512, 514, 516, 518, 520, and 522. At operation 502, one or more manifests associated with the software service to be provisioned are generated and included in the deployment file. In some embodiments, obtaining the one or more manifests includes pulling out one or more existing manifest associated with the one or more software services on the source deployment platform; and designating the existing one or more manifests as the one or more manifests for the one or more software services to be provisioned. In some embodiments, the one or more existing manifests pulled out from the source deployment platform may be used for the destination deployment platform without change. In some embodiments, the destination deployment platform is a container orchestration platform, and the manifest could include information describing the resources (e.g., deployments, services, pods, etc.), and how those resources run inside a cluster of the destination deployment platform. In one embodiment, an existing manifest from the source deployment platform includes a custom resource (OR). The custom resource is directly used for the destination deployment platform without changed. The custom resource may enable the operator of the destination deployment platform to introduce unique objects or types into the destination deployment platform to meet the pre-established custom requirements according to an application's underlying business logic.

At operation 504, one or more configuration templates from a centralized location are pulled out and are included in the deployment file. The term "configuration template," as used herein, generally refers to any file, code, and/or data that is designed to generate a configuration file that includes one or more configuration settings that define at least a portion of an operating environment of a node, a pod, and/or a container. In some embodiments, a configuration setting may be a variable configuration setting that does not have a fixed static value. In some embodiments, a configuration template may include functions, loops, variables, argument-defined parameters, and/or other methods of dynamically calculating settings. In some embodiments, a configuration template may also include one or more static settings. In some embodiments, a configuration template may also include static default values that may be used for variable configuration settings if the variable configuration settings are not externally specified when the dynamic template is processed. In some embodiments, the configuration template enables creating and processing large and complex configurations for multiple software services.

The one or more configuration templates may be pulled from a centralized location of the source deployment platform and directly used to configure the nodes, pods, and containers in the destination deployment platform without change. In some embodiments, the destination deployment platform is a container orchestration platform (e.g., the Kubernetes platform), and one or more configuration files each containing one or more running instances may be generated using the one or more configuration templates pulled from the source deployment platform. The number of running instances to be included in each node of the container orchestration platform may be configured using the one or more configuration templates. The generated configuration file for each of the nodes, pods, or containers of the destination container orchestration platform is specific to the target runtime environment as reflected by the parameters used in processing the one or more configuration templates. In some embodiments, the service file is a deployment YAML suitable for the Kubernetes platform.

At operation 506, the instances associated with the software service to be provisioned is configured and the configuration of instances are included in the deployment file. In some embodiments, the number and location of the instances to be deployed on each pod or container of the destination deployment platform can be configured using the configuration template(s) and written into the deployment file.

At operation 508, environment variables of the software services to be provisioned are obtained. In some embodiments, the profile according to operations 302 and 304 indicates one or more configurations for at least one environment variable for the existing software service on the source deployment platform, and the operation 508 further includes: identifying the one or more configurations for the at least one environment variable of the software services on the source deployment platform; translating the one or more configurations for the at least one environment variable to a corresponding set of one or more configurations for the environment variable on the destination deployment platform; and writing the corresponding set of the one or more configurations to the deployment document. In some embodiments, the destination deployment platform is the Kubernetes platform. Examples of the Kubernetes environment variables include APPLICATION_ID (an identifier for authorizing the software service to be deployed), MASTER_KEY (an identifier that authorizes the master (root) user), and DATABASE_URI (The URI for your MongoDB cluster).

At operation 510, resource limits and requests for the software service to be provisioned are obtained and included in the deployment file. In some embodiments, the profile according to operations 302 and 304 indicates one or more configurations for at least one resource limit and request for the existing software service on the source deployment platform, In some embodiments, the operation 510 further includes: identifying the one or more configurations for at least one resource limit and request for the existing software service on the source deployment platform; translating the one or more configurations for the at least one resource limit and request to a corresponding set of one or more configurations for the resource limit and request on the destination deployment platform; and writing the corresponding set of the one or more configurations to the deployment document. Resource requests specify the minimum amount of a resource required to run the software service. Resource limits specify the maximum amount of a resource that a software service can consume. When the destination deployment platform is a container orchestration platform such as the Kubernetes platform, the pod requests the resources required to run its containers. If configured properly, the Kubernetes platform guarantees that these resources are available to the pod. The most commonly requested resources are CPU and memory, but the Kubernetes platform has support for other resource types as well, such as GPUs and more. Requests are used when scheduling pods to nodes. The scheduler of the Kubernetes platform will ensure that the sum of all requests of all pods on a node does not exceed the capacity of the node. Therefore, a pod is guaranteed to have at least the requested resources when running on the node.

At operation 512, metadata associated with the software service to be provisioned on the destination deployment platform is obtained and included in the deployment file. Metadata is data that helps uniquely identify the object, including a name string, UID, and optional namespace. In some embodiments, the operation 512 further includes identifying existing metadata associated with the software service on the source deployment platform; identifying unneeded metadata of the existing metadata; and stripping off the unneeded metadata based on the requirement of the destination deployment platform.

At operation 514, service images associated with the software service(s) to be provisioned on the destination deployment platform are populated. Service images bundle a software service and its dependencies, under a root filesystem, into a single artifact. In some embodiments, the service image is a container image. The container image may be in a format is the Docker image format, which is the primary image format supported by the Kubernetes platform. Docker images also include additional metadata used by a container runtime to start a running application instance based on the contents of the container image. In some embodiments, the image uniform resource identifier (URI) for each of the container images is generated for each software service to be provisioned on the destination deployment platform.

At operation 516, configuration server metadata associated with the software service to be provisioned on the destination deployment platform is populated and included in the deployment file. In some embodiments, the config server metadata may be generated and stored in an API object of the destination deployment platform, e.g., a ConfigMap of the Kubernetes platform. In some embodiments, the configuration server metadata further includes binary data fields, which accept key-value pairs as their values.

At operation 518, secret discovery data associated with the software service to be provisioned on the destination deployment platform is populated. Secrete discovery data is encrypted data underlying a secret used in the destination deployment platform. A secret is an object that contains a small amount of sensitive data such as a password, a token, or a key. Such information might otherwise be put in a pod specification or a service image. Secrets are similar to configuration server metadata but are specifically intended to hold confidential data. Using a secret means that no confidential data is required to be stored in the application code. Because secrets can be created independently of the pods that use them, there is less risk of the secret (and its data) being exposed during the workflow of creating, viewing, and editing pods for provisioning the software services on the destination deployment platform. Kubernetes platform, and applications that run in the Kubernetes cluster, can also take additional precautions with secrets, such as avoiding writing secret data to nonvolatile storage.

In some embodiments, the secret discovery data associated with the existing software service(s) on the source deployment platform is pulled out and directly implemented in the corresponding software service(s) to be deployed on the destination deployment platform, using a third-party tool such as Vault. No confidential data from the secret is retrieved or revealed during the deployment process without permission, thereby improving the overall protection of the secrets.

At operation 520, Dynatrace tagging for monitoring is translated. Tags in Dynatrace are basically labels or markers while metadata are key/value pairs that are inherent to any monitored entity. Metadata is mainly used for defining extra information for entities while tags are used for organizing entities. Tags can be created based on metadata. In some embodiments, the operation 520 further includes identifying existing tags associated with the software service on the source deployment platform; translating the existing tags according to requirements for the destination deployment platform; and writing the translated tags in the deployment file.

At operation 522, at least one health-check associated with the software service to be provisioned on the destination deployment platform is generated. When a software service is running as a container in the destination deployment platform, it is automatically kept alive using a process health-check. This health-check ensures that the main process of the software service is always running. If the process health-check indicates a failure, the destination deployment platform restarts the application. In some embodiments, the profile according to operations 302 and 304 indicates one or more configurations for at least one health-check on the software service on the source deployment platform, and the operation 522 further includes identifying the one or more configurations for at least one health-check on the software service on the source deployment platform; translating the one or more configurations for the at least one health-check to a corresponding set of one or more configurations for the health-check on the destination deployment platform; and writing the corresponding set of the one or more configurations to the deployment document.

In some embodiments, the destination deployment platform is a container orchestration platform such as the Kubernetes platform. The Kubernetes platform uses health-checks (also known as probes) to determine if instances of the software services are running and responsive. By default, the Kubernetes platform offers two kinds of health-checks: the readinessProbe and the livenessProbe. Both of them use the same types of probes (HTTP GET requests, TCP connections, and command execution). They differ in the decision they take in response to a failing pod. The health-check in the Kubernetes platform may include multiple process checks that run application-specific logic (e.g., loading a web page) for a plurality of application to verify that each of the applications is not only running, but is also functioning properly. Since these health-checks are application-specific, they may be defined in the pod manifest.

At operation 524, a format linting process is performed to formalize the generated deployment file associated with the software service to be provisioned and deployed on the destination deployment platform. A lint tool such as Kuber-Linter provided by the Kubernetes platform may be used to lint the format to check the deployment files. In some embodiments, the linting process further includes a Helm lint. The Helm lint is a command that takes a path to a chart and runs a series of tests to verify that the chart is well-formed. The format linting process ensures the applications represented in them adhere to best practices in the Kubernetes platform. In some embodiments, the linting process not only checks for syntax validity, but also for other types of informalities such as key repetition, cosmetic problems, line length, trailing spaces, indentation, etc.

Figure 6:
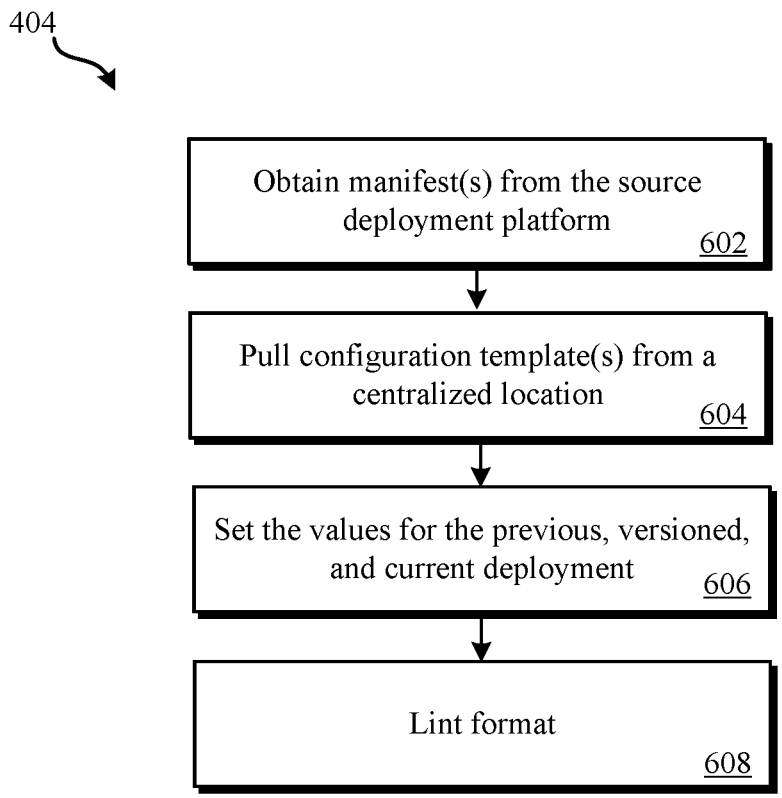
FIG. 6 is a schematic diagram illustrating an embodiment of an operation of the method according to FIG. 4.

FIG. 6 is a flowchart diagram illustrating an example of the operation 404 according to FIG. 4. As mentioned above, the operation 404 includes generating a service file of the deployment document. The service file provides an instruction for the automated deployment of the software service to be provisioned on the destination deployment platform. Once deployed on a container orchestration platform, the software service on the destination deployment platform may be a logical abstraction for a deployed group of pods in a cluster (which all perform the same function). Since pods are ephemeral, the software service enables a group of pods, which provide specific functions (web services, image processing, etc.) to be assigned a name and unique IP address (clusterIP). The service file can be created in an imperative way or a declarative way. In the imperative way, a CLI command can be used to create a deployment and then apply the deployment to the software service. In the declarative way, a desired deployment state is described in the deployment file and then the deployment is applied. In some embodiments, the service file is a service YAML suitable for the Kubernetes platform.

In the example illustrated in FIG. 6, the operation 404 further includes operations 602, 604, 606, and 608. At operation 602, manifest(s) associated with the software service to be provisioned are generated and included in the service file. Similar to the operation 502, the existing manifest(s) associated with software services of the source deployment platform may be pulled out and directly used for the software services to be provisioned on the destination deployment platform without change.

At operation 604, configuration template(s) from a centralized location is pulled out and the configuration template(s) are included in the service file. Similar to the operation 504, the configuration template may be pulled from a centralized location from the web server interface where the centralized location is stored. For a container orchestration platform (e.g., the Kubernetes platform), the number of running instances to be included in each node of the container orchestration platform may be configured using the configuration template. The generated configuration is specific to the target runtime environment as reflected by the parameters used in processing the configuration template.

At operation 606, values for the previous, versioned, and current deployment are set and included in the service file. At operation 608, a format linting process is performed to check the format of the service file, in a similar manner as the operation 524.

Figure 7:
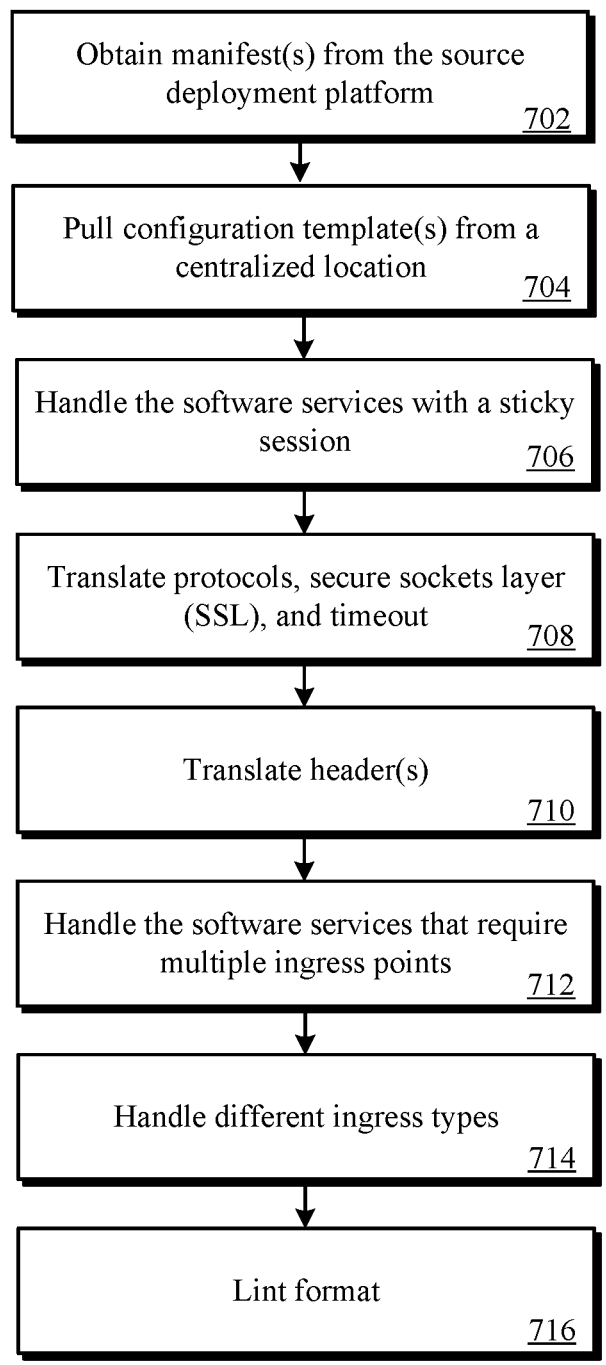
FIG. 7 is a schematic diagram illustrating an embodiment of an operation of the method according to FIG. 4.
Figure 8:
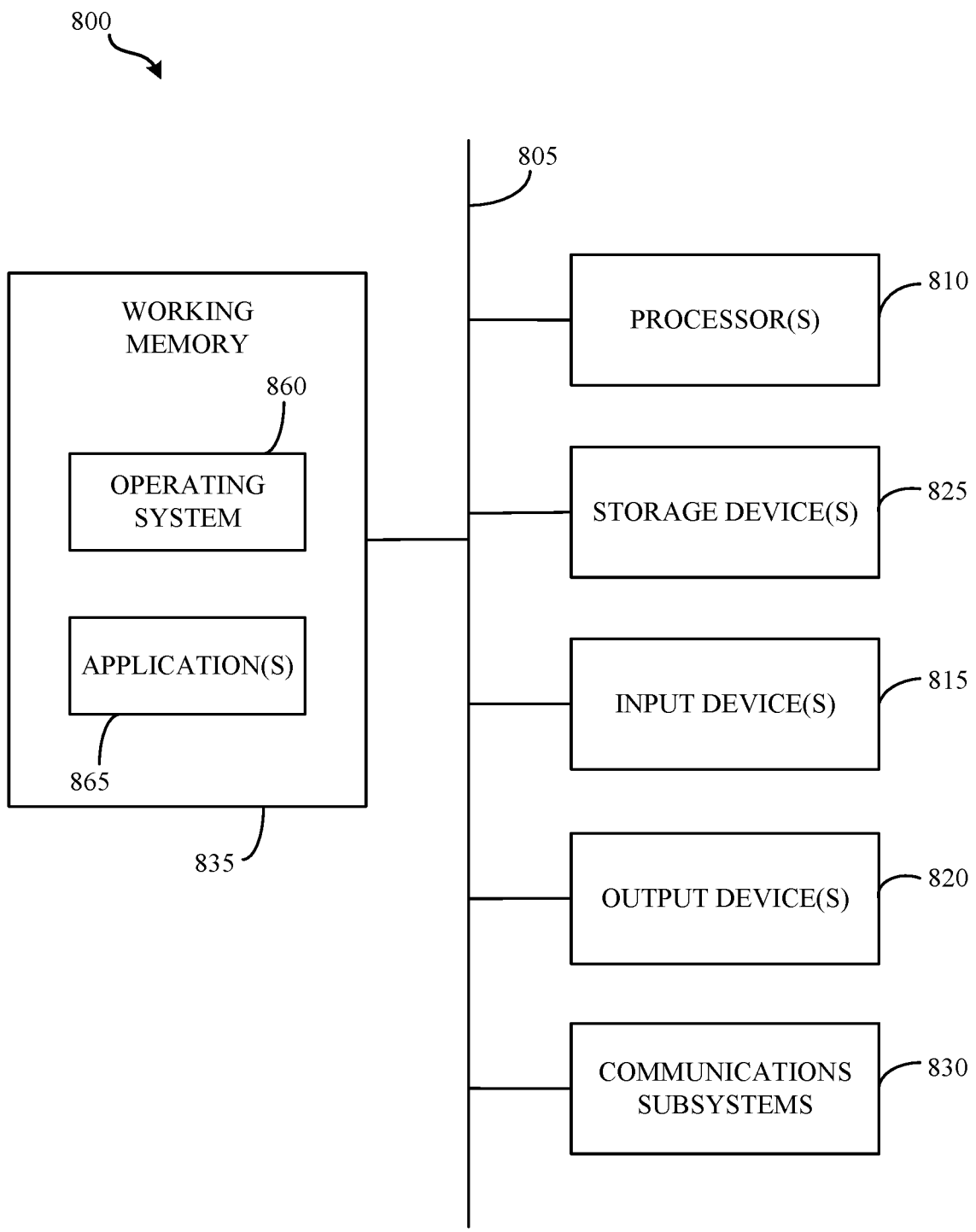
FIG. 8 is a schematic diagram illustrating an example of a computer system according to various embodiments.

FIG. 7 is a flowchart diagram illustrating an example of the operation 406 according to FIG. 4. As mentioned above, the operation 406 includes generating an ingress file of the deployment document. An ingress is an API object that provides routing rules to manage external users' access to the services in a cluster of the destination deployment platform such as the Kubernetes platform, typically via HTTPS/HTTP. With the ingress, one can easily set up rules for routing traffic without creating a bunch of load balancers or exposing each service on the node. Ingress is the ideal choice for a production environment. Users can expose services within the cluster of a container orchestration platform without having to create multiple load balancers or manually expose services. For example, in the Kubernetes platform, the ingress offers a single-entry point for the Kubernetes cluster, allowing administrators to manage the deployed software services easily and diagnose any routing issues. This decreases the attack surface of the cluster, automatically increasing the overall security. Some use cases of the Kubernetes ingress include providing externally reachable URLs for services; loading and balancing traffic; offering name-based virtual hosting; terminating SSL (secure sockets layer) or TLS (transport layer security). The Kubernetes ingress also supports multiple protocols, authentication, content-based routing, etc., and allows users to manage and configure them in Kubernetes clusters easily. In some embodiments, a Kubernetes ingress includes an ingress API object and an ingress controller. The API object indicates the services that need to be exposed outside the cluster and includes the routing rules. The ingress controller is the actual implementation of the ingress. The ingress controller is usually a load balancer that routes traffic from the API to the desired services within the Kubernetes cluster. In some embodiments, the ingress file is an ingress YAML suitable for the Kubernetes platform.

In the example illustrated in FIG. 7, the operation 406 further includes operations 702, 704, 706, 708, 710, 712, 714, and 716. At operation 702, manifest(s) associated with the software service to be provisioned are generated and included in the ingress file. Similar to the operations 502 and 602, the existing manifest(s) associated with software services of the source deployment platform may be pulled out and directly used for the software services to be provisioned on the destination deployment platform without change. At operation 704, configuration template(s) from a centralized location is pulled out and the configuration template(s) are included in the ingress file. Similar to the operations 504 and 604, the configuration template may be pulled from a centralized location from the web server interface where the centralized location is stored.

At operation 706, the software services to be provisioned on the destination deployment platform are handled with a sticky session. A sticky session or session affinity or session persistence is a feature that allows one to keep a session alive for a certain period of time. In a cluster of a container orchestration platform such as the Kubernetes platform, all the traffic from a client to a software service, even in the presence of 1 to 3 or more replicas, could be redirected to the same pod. In some embodiments, annotations can be used to configure session affinity. Examples of annotation in the Kubernetes platform include "nginx.ingress.kubernetes.io/ affinity-mode" (defining how sticky a session is); "nginx- .ingress.kubernetes.io/affinity-canary-behavior" (defining session affinity behavior of canaries); and "nginx.ingress.kubernetes.io/session-cookie-change-on-failure". In some embodiments, the annotation includes a use balanced to redistribute some sessions when scaling pods or persistent for maximum stickiness. The annotations may be included in the ingress file.

At operation 708, the protocol, SSL, and timeout associated with the software services to be provisioned on the destination deployment platform are generated and included in the ingress file. In some embodiments, the operation 708 further includes identifying existing protocol, SSL, and timeout associated with the software services on the source deployment platform; translating the identified existing protocol, SSL, and timeout according to the requirements of the designation deployment platform; and formalizing translated protocol, SSL, and timeout. In some embodiments, the protocol may include TCP or other supported protocols used in the destination deployment platform. As many software services need to expose more than one port on the destination deployment platform, the destination deployment platform may support multiple port definitions on a service object. Each port definition can have the same protocol or a different one. In the destination deployment platform, SSL certificates are needed so that a browser can create a secure connection with the services. The SSL certificates are stored as secrets. In some embodiments, the SSL certificates can be added to the ingress file (e.g., an ingress YAML) by deploying a test application, creating a TSL secret, and add the TSL secret to the ingress object of the Kubernetes platform.

At operation 710, headers associated with the software services to be provisioned on the destination deployment platform are generated and included in the ingress file. In some embodiments, the operation 710 further includes identifying existing headers associated with the software services on the source deployment platform; translating the identified existing headers according to the requirements of the designation deployment platform; and formalizing translated headers to be included in the ingress file. When the destination deployment platform is a container orchestration platform such as the Kubernetes platform, a nginx ingress controller may be configured via the ConfigMap to pass a custom list of headers to the upstream server. In some implementations, the nginx ingress controller reads the "ingress-nginx/ingress-nginx-controller ConfigMap," find the "proxy-set-headers" key, read HTTP headers from the ingress-nginx/custom-headers ConfigMap, and include those HTTP headers in all requests flowing from nginx to the backends.

At operation 712, software services that require multiple ingress points are handled. In some embodiments, the operation 712 further includes identifying the existing software services that require multiple ingress points from the source deployment platform; and determining if the identified software services require multiple ingress points on the destination deployment platform. In some embodiments, multiple ingress controllers may be used to handle the software services requiring multiple ingress points. When the destination deployment platform is a container orchestration platform such as the Kubernetes platform, the class annotation such as "kubernetes.io/ingress.class" may be used when one ingress controller is running. In other situations where one or more ingress controllers do not support IngressClasses when multiple ingress controllers are running.

At operation 714, different ingress types associated with the software services to be provisioned on the destination deployment platform are generated. In some embodiments, three types of the ingress that are handled include a single service ingress, a simple fanout ingress, and a name-based virtual hosting ingress. The single service ingress is backed by a single service where a single service is exposed. The single service ingress may be defined by specifying a default backend without any rules. The fanout ingress is where a single-entry point (single IP address) is used to expose multiple services. There, URL traffic gets routed to the desired destination depending on the request. This single ingress allows users to reduce the number of load balancers and easily manage the routing within the cluster. The name-based virtual hosting ingress can be used to route traffic from a single entry (IP address) to different hosts within the cluster of the destination deployment platform.

At operation 716, a format linting process is performed to check the format of the ingress file, in a similar manner as the operations 524 and 608.

Having described several example configurations, various modifications, alternative constructions, and equivalents may be used without departing from the spirit of the disclosure. For example, the above elements may be components of a larger system, wherein other rules may take precedence over or otherwise modify the application of the present disclosure. Also, a number of steps may be undertaken before, during, or after the above elements are considered.

What is claimed is:

1. A computer-implemented method of provisioning a software service on a destination deployment platform, the method comprising:
    receiving a request to provision the software service, the request including information indicating a profile configuring the software service on a source deployment platform;
    obtaining the profile based on the request from a web server interface;
    determining a version of the software service for provisioning the software service on the destination deployment platform; and
    generating a deployment document, the generating comprising writing the determined version of the software service to the deployment document.

2. The method according to claim 1, wherein generating the deployment document comprises: populating configuration server metadata in the deployment document.

3. The method according to claim 1, wherein the profile indicates one or more configurations for at least one health-check on the software service on the source deployment platform, and wherein generating the deployment document further comprises: translating the one or more configurations for the at least one health-check to a corresponding set of one or more configurations for the health-check on the destination deployment platform; and writing the corresponding set of the one or more configurations to the deployment document.

4. The method according to claim 1, wherein generating the deployment document further comprises: obtaining a configuration template for the software service from a centralized location of the web server interface.

5. The method according to claim 1, wherein the profile indicates one or more configurations for at least one environment variable for the software service on the source deployment platform, wherein generating the deployment document further comprises: translating the one or more configurations for the at least one environment variable to a corresponding set of one or more configurations for the environment variable on the destination deployment platform; and writing the corresponding set of the one or more configurations to the deployment document.

6. The method according to claim 1, wherein generating the deployment document further comprises: populating secret discovery data associated with the software service.

7. The method according to claim 1, wherein the deployment document comprises: a deployment file, a service file, and an ingress file.

8. The method according to claim 1, wherein the destination deployment platform is a container orchestration platform.

9. A computerized system for provisioning a software service on a destination deployment platform, the computerized system comprising:
one or more processors;
a machine-readable storage medium in electronic communication with the one or more electronic processors; and
instructions stored in the machine-readable storage medium and executable by the one or more electronic processors to cause the system to:
receive a request to provision the software service, the request including information indicating a profile configuring the software service on a source deployment platform;
obtain the profile based on the request from a web server interface;
determine a version of the software service for provisioning the software service on the destination deployment platform; and
generate a deployment document, the generating comprising writing the determined version of the software service to the deployment document.

10. The computerized system according to claim 9, wherein the one or more processors are further instructed to populate configuration server metadata in the deployment document.

11. The computerized system according to claim 9, wherein the profile indicates one or more configurations for at least one health-check on the software service on the source deployment platform, and wherein the one or more processors are further instructed to:
translate the one or more configurations for the at least one health-check to a corresponding set of one or more configurations for the health-check on the destination deployment platform; and
write the corresponding set of the one or more configurations to the deployment document.

12. The computerized system according to claim 9, wherein the one or more processors are further instructed to obtain a configuration template for the software service from a centralized location of the web server interface.

13. The computerized system according to claim 9, wherein the profile indicates one or more configurations for at least one environment variable for the software service on the source deployment platform, and wherein the one or more processors are further instructed to:
translate the one or more configurations for the at least one environment variable to a corresponding set of one or more configurations for the environment variable on the destination deployment platform; and
write the corresponding set of the one or more configurations to the deployment document.

14. The computerized system according to claim 9, wherein the one or more processors are further instructed to populate secret discovery data associated with the software service.

15. The computerized system according to claim 9, wherein the deployment document comprises a deployment file, a service file, and an ingress file.

16. The computerized system according to claim 9, wherein the destination deployment platform is a container orchestration platform.

17. A non-transitory machine-readable storage medium encoded with instructions, the instructions executable to cause one or more processors of a service-provisioning system to perform one or more operations of a method, the method comprising:
receiving a request to provision a software service, the request including information indicating a profile configuring the software service on a source deployment platform;
obtaining the profile based on the request from a web server interface;
determining a version of the software service for provisioning the software service on a destination deployment platform; and
generating a deployment document, the generating comprising writing the determined version of the software service to the deployment document.

18. The non-transitory machine-readable storage medium according to claim 17, wherein the method further comprises populating configuration server metadata in the deployment document.

19. The non-transitory machine-readable storage medium according to claim 17, wherein the profile indicates one or more configurations for at least one health-check on the software service on the source deployment platform, and wherein the method further comprises:
translating the one or more configurations for the at least one health-check to a corresponding set of one or more configurations for the health-check on the destination deployment platform; and
writing the corresponding set of the one or more configurations to the deployment document.

20. The non-transitory machine-readable storage medium according to claim 17, wherein the profile indicates one or more configurations for at least one environment variable for the software service on the software service on the source deployment platform, and wherein the method further comprises:
translating the one or more configurations for the at least one environment variable to a corresponding set of one or more configurations for the at least one environment variable on the destination deployment platform; and
writing the corresponding set of the one or more configurations to the deployment document.

* * * * *